(12) United States Patent
Sawant et al.

(10) Patent No.: US 11,720,898 B2
(45) Date of Patent: Aug. 8, 2023

(54) BIOMETRIC IDENTIFICATION FOR PAYLOAD ASSOCIATION AND RETRIEVAL

(71) Applicant: Adobe Inc., San Jose, CA (US)

(72) Inventors: Pari Sawant, Milpitas, CA (US); Jonathan Lancar, Fremont, CA (US); Seth Reilly, San Jose, CA (US); Shankar Srinivasan, San Ramon, CA (US)

(73) Assignee: ADOBE INC., San Jose, CA (US)

( * ) Notice: Subject to any disclaimer, the term of this patent is extended or adjusted under 35 U.S.C. 154(b) by 197 days.

(21) Appl. No.: 16/857,077

(22) Filed: Apr. 23, 2020

(65) Prior Publication Data

US 2021/0334814 A1 Oct. 28, 2021

(51) Int. Cl.
*G06Q 20/00* (2012.01)
*G06Q 20/40* (2012.01)
*G06Q 30/0601* (2023.01)
*G06Q 20/18* (2012.01)
*G06V 40/16* (2022.01)

(52) U.S. Cl.
CPC ....... *G06Q 20/40145* (2013.01); *G06Q 20/18* (2013.01); *G06Q 30/0603* (2013.01); *G06Q 30/0631* (2013.01); *G06Q 30/0643* (2013.01); *G06V 40/168* (2022.01); *G06V 40/172* (2022.01)

(58) Field of Classification Search
CPC .............................................. G06Q 20/40145
USPC ........................................................ 705/35
See application file for complete search history.

(56) References Cited

U.S. PATENT DOCUMENTS 9,519,901 B1 * 12/2016 Dorogusker ....... G06Q 20/3226
2006/0195328 A1 * 8/2006 Abraham ............... G06Q 30/02
235/382

(Continued)

FOREIGN PATENT DOCUMENTS

JP  5998922 B2 * 9/2016 ......... G06K 9/00892

OTHER PUBLICATIONS

IEEE Standard for an Architectural Framework for the Internet of Things (IoT) Published in: IEEE Std 2413-2019 (pp. 1-269) (Year: 2020).*

(Continued)

*Primary Examiner* — Bruce I Ebersman
*Assistant Examiner* — John A Anderson
(74) *Attorney, Agent, or Firm* — F. Chau & Associates, LLC

(57) ABSTRACT

Techniques and systems are provided for managing experience payloads associated with various users. A system obtains an experience payload and first biometric information of a user from a first computing device. The system generates a set of characteristic representations of the user using the first biometric information. The system associated the set of characteristic representations with the experience payload. In response to a request from a second computing device at a physical location to obtain the experience payload, the system evaluates biometric information from the request to determine whether it corresponds to the set of characteristic representations. If so, the system provides the experience payload to the second computing device to cause the second computing device to perform operations associated with the user at the physical location.

17 Claims, 9 Drawing Sheets

(56) References Cited

U.S. PATENT DOCUMENTS

| | | | |
|---|---|---|---|
| 2014/0081870 A1* | 3/2014 | de Sylva | G06Q 20/3224 |
| | | | 705/44 |
| 2015/0073907 A1* | 3/2015 | Purves | G06Q 20/384 |
| | | | 705/14.58 |
| 2017/0099295 A1* | 4/2017 | Ricci | G06Q 30/0265 |
| 2017/0223017 A1* | 8/2017 | Kohli | H04L 63/0853 |
| 2019/0066188 A1* | 2/2019 | Rothschild | G06Q 20/40145 |
| 2019/0130410 A1* | 5/2019 | Nicoletti | G06Q 20/326 |
| 2020/0104810 A1* | 4/2020 | Mallampalli | G06Q 20/12 |
| 2022/0050890 A1* | 2/2022 | Karantzis | H04L 63/18 |

OTHER PUBLICATIONS

Secure session on mobile: An exploration on combining biometric, trustzone, and user behavior Published in: 6th International Conference on Mobile Computing, Applications and Services (pp. 206-215) Authors: Tao Feng • Nicholas DeSalvo • Lei Xu • Xi Zhao • Xi Wang • Weidong Shi (Year: 2014).*

* cited by examiner

BIOMETRIC IDENTIFICATION FOR PAYLOAD ASSOCIATION AND RETRIEVAL

FIELD

This application is generally related to managing experience payloads associated with entities across different locations. For example, aspects of this application relate to configuring systems to associate biometric information with experience payloads that can be retrieved at physical locations using the biometric information.

BACKGROUND

With the proliferation of the Internet, consumers and other users have transitioned from shopping at physical locations, such as malls or "brick and mortar" retail locations, to shopping from the comfort of their own homes through the Internet. As a result, retailers and other organizations have continued to develop their online presence, establishing online storefronts through which consumers and other users may purchase various items and have these items delivered to them. This provides consumers with significant flexibility. For instance, consumers and other users can visit online marketplaces provided by these retailers and other organizations at any time without having to allocate time to visit a physical location to obtain various goods. Further, consumers and other users may perform price comparisons for the same or similar items by visiting competing online marketplaces.

However, for certain items, it can be desirable to inspect the items in person before purchasing these items. For instances, users often will want to try on apparel prior to making a purchase to ensure that the apparel will fit properly. Thus, users often utilize online storefronts to identify appealing items and then visit corresponding physical storefronts to inspect these items in person prior to completing their purchase. However, translating the online storefront experience to a physical storefront seamlessly can be difficult. For instance, if a user selects an item via an online storefront, by the time the user arrives at a corresponding physical storefront the item can no longer be available. Further, it can be difficult to identify a user's selections made via an online storefront at a physical location.

Techniques and systems are needed for providing a solution that can be used to translate a user's online shopping experience with that of an experience at a physical storefront or other physical location.

SUMMARY

Systems and related techniques are described herein that associate biometric information with experience payloads to allow for entities to transition an online experience to a physical location using the biometric information. For instance, in response to obtaining biometric information of a user and an experience payload via a platform service system, a biometric identification system can generate one or more characteristic representations of the user using the obtained biometric information. The biometric identification system can associate the one or more characteristic representations of the user with the experience payload. The platform service system can obtain a request from a computing device to obtain the experience payload. The computing device can be located at a physical location where the user is located and is seeking to continue an online experience at the physical location. Further, the request can include other biometric information of the user obtained by the computing device at the physical location. The platform service system can provide this other biometric information to the biometric information system, which can determine that the other biometric information corresponds to the one or more characteristic representations. As a result, the platform service system can provide the experience payload to the computing device. This can cause the computing device to perform operations associated with the user at the physical location.

Additional features and advantages of the present application will be set forth in the description which follows, and in part will be obvious from the description, or may be learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments are described in detail below with reference to the following figures.

DETAILED DESCRIPTION

Figure 1:
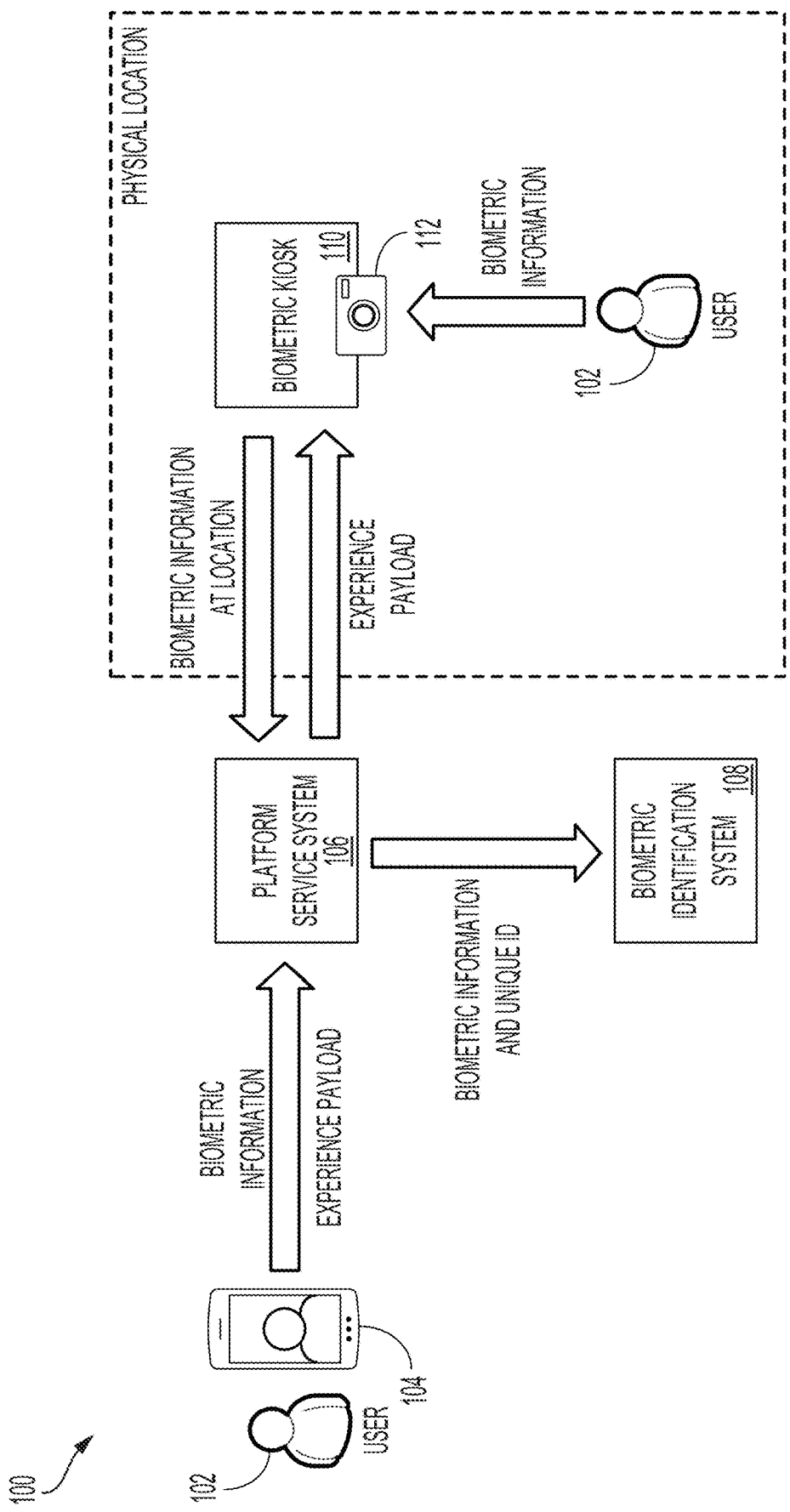
FIG. 1 is a diagram illustrating an example of an environment in which biometric information of a user is obtained and associated with an experience payload to enable retrieval of the experience payload at a physical location for the user in accordance with at least one embodiment.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, translating an online experience to a physical location is a difficult task. For example, it can be difficult to associate a particular user with an online experience payload (e.g., items selected, operations performed, etc.) that can be retrieved at a physical location to allow the user to continue this experience at the physical location. In some cases, if a user selects an item online, by the time the user arrives at a physical location to inspect the item, the item may no longer be available for inspection. In some cases, it can be difficult to verify, at a physical location, that the person at the physical location is associated with the online experience payload generated by the person. Such deficiencies can result in negative user experiences at physical locations.

One or more examples described herein include systems and related techniques that provide benefits over and solve one or more of the foregoing or other problems in the art. For example, the systems and related techniques can include a platform service system that can receive biometric information of a user and an experience payload. The biometric information may include a digital image of the user, a voice recording of the user, a cardiac signature (e.g., heartbeat patterns) of the user, one or more fingerprints of the user, one or more retinal scans of the user, vein patterns of the user, a face identifier (e.g., based on one or more facial features of the user), any combination thereof, and/or other biometric information. As described in further detail below, this biometric information can be used to identify a set of characteristic representations of the user that can be used to identify the user from any biometric information obtained at a later time. For instance, in response to obtaining an experience payload and biometric information of a user, a biometric identification system can generate the one or more characteristic representations of the user from the obtained biometric information. The one or more characteristic representations can vector representations (also referred to as vector embeddings) of a characteristic of the user, such as vector representations of facial features of the user. The experience payload may include a list of items selected by the user that are retrievable or otherwise available at a physical location. For instance, in the context of an online marketplace, the experience payload may include the items added to a virtual cart. In some examples, the biometric identification system can include a neural network with parameters (e.g., weights, biases, and/or other parameters) that are pre-trained using a facial recognition dataset. In one illustrative example, the neural network is used to convert biometric information into a set of vector embeddings that serve as the one or more characteristic representations of the user.

In some examples, the biometric identification system associates the one or more characteristic representations of the user with the experience payload. For instance, in response to obtaining the biometric information of the user and the experience payload, the platform service system may generate a unique identifier that corresponds to the biometric information and experience payload pairing. The platform service system can provide the unique identifier and the biometric information to the biometric identification system, which can associate the one or more characteristic representations of the user with the unique identifier.

In some examples, the platform service system obtains a request from a computing device located at the physical location to obtain the experience payload. The request can include biometric information of the user obtained by the computing device at the physical location. For example, when a user arrives at the physical location, the computing device can record an image of the user and transmit this image to the platform service system along with the request to obtain an experience payload associated with the user. In response to the request, the platform service system can transmit the obtained biometric information to the biometric identification system to determine whether the biometric information obtained at the physical location corresponds to a unique identifier associated with an experience payload.

In some examples, the biometric identification system evaluates the biometric information obtained at the physical location to generate a new set of characteristic representations of the person at the physical location. The biometric identification system can compare this new set of characteristic representations to known sets of characteristic representations associated with unique identifiers generated by the platform service system. If the biometric identification system identifies a unique identifier as a result of the new set of characteristic representations matching the characteristic representations of the user, the biometric identification system can provide the unique identifier associated with the characteristic representations of the user to the platform service system.

In some examples, if the platform service system obtains a unique identifier corresponding to a pairing of an experience payload and biometric information of a user from the biometric identification system, the platform service system can use the unique identifier to query a database that includes entries corresponding to available experience payloads. These entries can be keyed to the unique identifiers generated by the platform service system. Thus, using the unique identifier obtained from the biometric identification system, the platform service system can identify an entry that includes an experience payload associated with the unique identifier. The entry can also include information about the user, such as a user profile, loyalty program information of the user, contact information of the user, and the like.

In some examples, the platform service system provides the experience payload to the computer system at the physical location to transition the user's online experience to the physical location. In response to obtaining the experience payload, the computing device at the physical location can perform operations associated with the user at the physical location. For instance, an associate at the physical location can review, from the experience payload, the items selected by the user and retrieve these items for the user. Further, if the user purchases the items at the physical location, through the experience payload, the user's loyalty program information can be obtained and used to reward the user for its purchase.

In some examples, the experience payload and the biometric information of the user obtained at the physical location can be used to generate a set of recommendations for the user. For instance, the platform service system can evaluate the items selected by the user and the attire worn by the user at the physical location to generate recommendations for additional and/or alternative items that may be appealing to the user. These recommendations can be provided to the computer system at the physical location, where an associate or other staff can present these recommendations to the user.

The systems and related techniques described herein provide several advantages. For example, because a user's experience payload (e.g., online experience, item selections, etc.) are associated with a user's biometric information, the experience payload can be retrieved automatically using biometric information of the user collected at a physical location. Further, because a user's experience payload is stored by the platform service system for translation to a physical location, users can be reassured that their online experience can continue seamlessly at the physical location. These improvements can result in the improvement of a user's experience at physical locations stemming from online interactions with retailers and other online marketplace providers.

FIG. 1 shows an illustrative example of an environment 100 in which biometric information of a user 102 is obtained and associated with an experience payload to enable retrieval of the experience payload at a physical location for the user 102 in accordance with at least one embodiment. In the environment 100, a user 102 may utilize a computing device 104 to generate biometric information that may be used to identify the user 102 and an experience payload that can be extended from an online environment (e.g., through a website, online marketplace, etc.) to a physical location (e.g., "brick and mortar" storefront, physical office, etc.). The computing device 104 may include a smartphone, smartwatch, laptop computer, personal computer, tablet computer, and the like. Further, the computing device 104 may be communicatively connected to a communications network, such as the Internet. The computing device 104 can include one or more peripheral devices that may be used to obtain the biometric information of the user 102. For instance, the computing device 104 may include or be operatively connected to a camera, microphone, heart rate sensor, fingerprint reader or scanner, near-infrared scanner, or other device that may be configured to obtain biometric information of the user 102. The biometric information may include a digital image of the user 102, a voice recording of the user 102, fingerprints of the user 102, cardiac signatures or recordings of the user 102, a face identifier (e.g., based on one or more facial features of the user), vein images of the user 102, any combination thereof, and/or any other suitable biometric information that may be used to uniquely identify the user 102.

In an embodiment, through the computing device 104, a user 102 can access an online environment through which the user 102 can generate an experience payload that can be extended from the online environment to a physical location associated with the online environment. For example, through the computing device 104, a user 102 may access an online marketplace through which the user 102 may view, select, and order a variety of items made available by a retailer or other entity via the online marketplace. The retailer or other entity that maintains the online marketplace may also manage and maintain one or more physical locations, such as a "brick and mortar" storefront, through which the variety of items may also be available. As another example, through the computing device 104, a user may access a website associated with a physical office, such as a medical facility, commercial office, government agency office, and the like. Through this website, a user 102 may schedule an appointment, provide a request for service, reserve one or more items that can be retrieved from the physical office, and the like. The experience payload generated within the online environment may include a selection of items made available by a retailer, a request for service at the physical location, a reservation for one or more items retrievable at a physical location, and the like.

Through the online environment, the user 102 may indicate that the user 102 wishes to associate biometric information of the user 102 with the experience payload to allow the user 102 to continue the online experience at a physical location associated with the online environment. For instance, within the online environment, a retailer or other entity may provide users with an option to translate their online experience to a physical location or to otherwise associate their online experience with biometric information that may be used to resume the online experience at a physical location. If a user 102 selects this option through the online environment, a signal or other instruction may be transmitted from the online environment to the computing device 104 to initiate one or more peripheral devices that may be used to obtain the user's biometric information. For instance, if the user 102 selects a graphical user interface (GUI) button presented within the online environment to associate the experience payload with biometric information of the user 102, a server or other system associated with the online environment may transmit an executable instruction to the computing device 104 to initiate one or more peripheral devices of the computing device 104 to record the user's biometric information.

In an embodiment, the online environment is associated with a platform service system 106 that is configured to maintain a user's biometric information and experience payload to allow the user 102 to resume an online experience at a physical location. For instance, if a user 102 selects an option within the online environment to save their online experience and to associate this online experience with biometric information of the user 102, the experience payload generated within the online environment and the biometric information generated using the computing device 104 may be transmitted to the platform service system 106. In an embodiment, a server or other system configured to provide the online environment (e.g., a web server, etc.) may transmit the biometric information obtained from the computing device 104, as well as the experience payload generated within the online environment, to the platform service system 106. In an alternative embodiment, if the online environment is provided via an application installed on or otherwise implemented on the computing device 104, the computing device 104 can transmit the experience payload and the biometric information directly to the platform service system 106, as illustrated in FIG. 1.

In response to obtaining the biometric information and experience payload of the user 102, the platform service system 106 may generate a unique identifier corresponding to the pairing of the biometric information and the experience payload. The unique identifier may be specific to this pairing as opposed to the user associated with the biometric information and the experience payload. For instance, a user 102 may have multiple unique identifiers corresponding to different biometric information and experience payload pairings. In an embodiment, the unique identifier may also be associated with the particular entity that is associated with the online environment and physical location where the online experience may be continued. In some instances, the unique identifier may be subject to an expiration, whereby if the unique identifier is not utilized within a period of time, the unique identifier and corresponding pairing expires and is removed from the platform service system 106. This may reduce the number of conflicting or coincident experience payloads for a user for a given retailer or other entity.

In an embodiment, the platform service system 106 includes a user database or other repository that is used to maintain entries corresponding to unique identifier-to-experience payload pairings. For instance, using a unique identifier, the platform service system 106 can query the user database or other repository to identify an entry corresponding to the unique identifier that may include an experience payload. As noted above, a unique identifier may be subject to an expiration, whereby the unique identifier is removed from the system 106 upon expiration. Thus, if a unique identifier is expired, the entry corresponding to the unique identifier and experience payload may be removed or deleted from the user database or other repository.

In an embodiment, the platform service system 106 provides the unique identifier and the biometric information of the user 102 to a biometric identification system 108. The biometric identification system 108 may be configured to process the biometric information to generate one or more characteristic representations of the user 102. These one or more characteristic representations of the user 102 may be unique to the user 102. For instance, these one or more characteristic representations of the user 102 may correspond to the salient features of the user 102, physical dimensions or other parameters of these salient features, physical distances between these salient features, and the like. In an embodiment, the one or more characteristic representations of the user 102 are vector embeddings that can used within a feature space to identify the user 102 and distinguish the user 102 from other users and entities.

In an embodiment, the biometric identification system 108 utilizes one or more machine learning algorithms or techniques to generate the one or more characteristic representations of the user 102. For example, if the biometric information of the user 102 includes a digital image of the user 102, the biometric identification system 108 may use one or more facial recognition algorithms to identify the one or more characteristic representations of the user 102 from the digital image. For instance, the biometric identification system 108 may use a neural network (e.g., convolutional neural network (CNN) or other deep neural networks (DNNs)), geometric recognition algorithms, photometric recognition algorithms, principal component analysis using eigenfaces, linear discrimination analysis, elastic bunch graph matching using Fisherface algorithms, hidden Markov modeling, multilinear subspace learning using tensor representation, neuronal motivated dynamic link matching, support vector machines (SVMs), or any other suitable machine learning technique.

In an embodiment, the machine learning algorithms or techniques utilized to identify the one or more characteristic representations of a user 102 may be trained to extract these characteristic representations from the provided biometric information. For instance, a machine learning algorithm utilized by the biometric identification system 108 may be trained subject to one or more loss functions, such as a triplet loss function, whereby a baseline input is compared to a positive input and a negative input. Training of the machine learning algorithm may involve reducing the distance between a baseline input and a positive input and maximizing the distance between the baseline input and a negative input via use of a loss function:

$$\mathcal{L}(A,P,N) = \max(\|f(A)-f(P)\|^2 - \|f(A)-f(N)\| + \alpha, 0) \quad \text{(Eq. 1)}$$

where A is an anchor (e.g., baseline) input, P is a positive input of the same class as A, N is a negative input of a different class from A, a is a margin between positive and negative pairs, and f is a characteristic representation. The resulting loss may be used to minimize the L2 distance between images of the same identity (corresponding to the same entity) and maximizes the L2 distance between the images of different identities (corresponding to different entities). This enables images of a particular identity to be projected into a single point in the embedding, or representation, space. The machine learning algorithms or techniques may be trained using a training dataset of biometric information, such as the Labelled Faces in the Wild (LFW) dataset, which may include a large collection of biometric information of distinct entities, where each unit biometric information maintains a label.

In an embodiment, using the one or more machine learning algorithms or techniques, the biometric identification system 108 extracts the one or more characteristic representations of the user 102 from the biometric information and associates these one or more characteristic representations of the user 102 with the provided unique identifier. For instance, the biometric identification system 108 may maintain a database or other repository that includes entries corresponding to unique identifier and characteristic representation pairings. As noted above, the unique identifier may be subject to an expiration. Thus, if the unique identifier is expired, the entry corresponding to the unique identifier within this database or other repository may also be automatically removed or deleted. Each entry may include an association between a unique identifier and the characteristic representations extracted from the biometric information that is associated with the unique identifier by the platform service system 106.

When a user 102 arrives at a physical location associated with the online environment through which the user 102 generated an experience payload and provided its biometric information, the user 102 may provide new biometric information that may be used to retrieve the experience payload from the platform service system 106. For example, the physical location may include a biometric kiosk 110 or other computing device that is configured to obtain biometric information of the user 102 to retrieve the experience payload of the user 102 and allow the user 102 to continue its online experience at the physical location. For instance, when the user 102 arrives at the physical location, the biometric kiosk 110 may automatically capture biometric information of the user 102 using one or more peripheral devices 112. Alternatively, the user 102 may approach the biometric kiosk 110 at the physical location and utilize one or more peripheral devices of the biometric kiosk 110 to provide its biometric information. The one or more peripheral devices 112 used to capture biometric information of the user 102 at the physical location may correspond to the peripheral devices utilized in conjunction with the computing device 104. This may ensure that the biometric information captured at the physical location is of the same type as that provided to the platform service system 106 with the experience payload by the computing device 104 or by a server or other system associated with the online environment.

In an embodiment, in response to obtaining the user's biometric information at the physical location, the biometric kiosk 110 transmits a request to the platform service system 106 to retrieve an experience payload associated with the user 102 that may be used to translate the user's online experience to the physical location. The request may include the biometric information obtained at the physical location by the biometric kiosk 110 using the one or more peripheral devices 112.

In response to the request from the biometric kiosk 110, the platform service system 106 may provide the biometric information to the biometric identification system 108 to identify a unique identifier that may be associated with the provided biometric information. The biometric identification system 108 may process the biometric information from the biometric kiosk 110 to identify a set of characteristic representations corresponding to the user 102 captured at the physical location. The biometric identification system 108 may compare this set of characteristic representations to sets of known characteristic representations maintained by the biometric identification system 108 within its database or other repository to determine whether a set of known characteristic representations matches or otherwise satisfies a similarity threshold with the set of characteristic representations corresponding to the user 102 captured at the physical location. The similarity threshold may be defined based on historical performance of the biometric identification system 108 in identifying users from various biometric information provided by these users.

If the biometric identification system 108 is unable to identify a set of known characteristic representations that corresponds to the set of characteristic representations of the user 102 extracted from the biometric information obtained from the biometric kiosk 110, the biometric identification system 108 may indicate, to the platform service system 106, that a unique identifier could not be obtained for the biometric information provided. This may cause the platform service system 106 to indicate, to the biometric kiosk 110, that no experience payload is available for the user 102. This may occur if the user 102 has not generated an experience payload within the online environment, as described above, or the unique identifier associated with the user's biometric information obtained from the computing device 104 has expired.

In an embodiment, if the biometric identification system 108 identifies, from the database or repository, a set of known characteristic representations that matches or satisfies a similarity threshold with the set of characteristic representations extracted from the biometric information obtained by the biometric kiosk 110, the biometric identification system 108 identifies a corresponding unique identifier of the set of known characteristic representations. As noted above, the biometric identification system 108 may associate a unique identifier with a set of characteristic representations extracted from biometric information obtained by the platform service system 106 from the computing device 104 or online environment. Thus, the unique identifier may be used to bridge the online environment to that of the physical location for the user 102. The biometric identification system 108 may provide the unique identifier to the platform service system 106.

Using the unique identifier obtained from the biometric identification system 108, the platform service system 106 may query its user database or repository to identify an entry corresponding to the provided unique identifier. As noted above, this user database or repository may include a set of entries, wherein each entry may correspond to a pairing of a unique identifier and a corresponding experience payload. Thus, using the unique identifier, the platform service system 106 may identify an entry that includes an experience payload associated with the unique identifier. The platform service system 106 may obtain the experience payload from the user database or other repository and provide the experience payload to the biometric kiosk 110 to fulfill the request. In an embodiment, in order to prevent collisions, the platform service system 106 removes the entry corresponding to the unique identifier from the user database or repository once the experience payload has been provided to the biometric kiosk 110.

In response to obtaining the experience payload from the platform service system 106, the biometric kiosk 110 may use the experience payload to continue the online experience at the physical location for the user 102. For instance, if the experience payload includes a list of items that the user 102 has selected within the online environment, the biometric kiosk 110 may provide this list to an associate at the physical location, who may obtain the set of items at the physical location and provide these to the user 102 for inspection (e.g., to sample, try on, etc.). Alternatively, if the experience payload includes a service request submitted by the user 102, the biometric kiosk 110 may provide the request to an associate which may use the request and any additional information to best serve the user 102 at the physical location. In some embodiments, the experience payload can include additional information of the user 102, such as loyalty program information, contact information, and the like. This additional information may be used to supplement the user experience at the physical location, such as rewarding the user 102 for a purchase at the physical location stemming from an online experience, and the like. Thus, the biometric information of the user 102 may be used at the physical location to identify the user 102 and obtain an experience payload associated with the user 102 to allow the user 102 to continue its online experience at the physical location.

Figure 2:
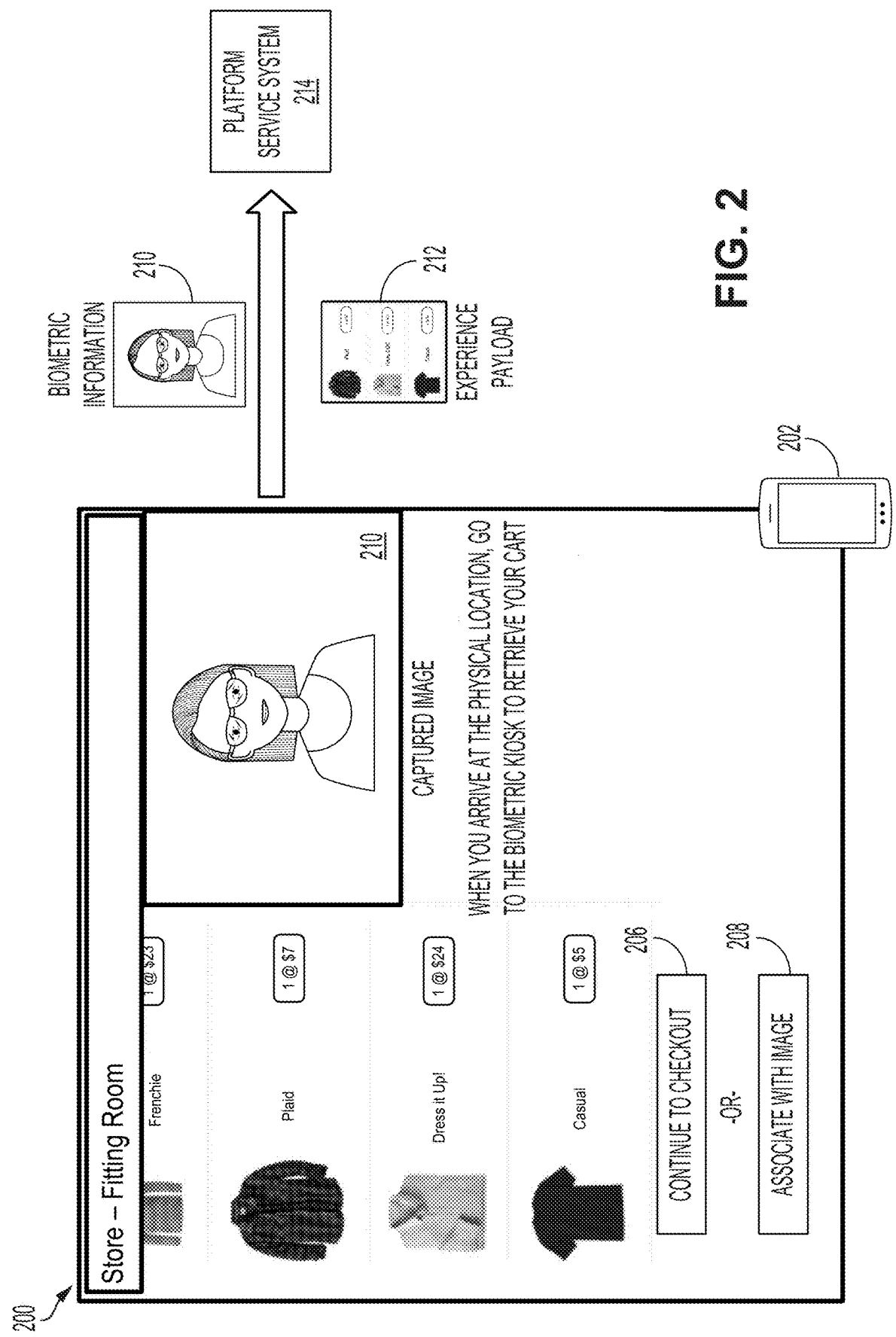
FIG. 2 is a diagram illustrating an example of an environment in which a computing device is utilized to capture biometric information of a user and an experience payload that is to be associated with the biometric information in accordance with at least one embodiment.

FIG. 2 shows an illustrative example of an environment 200 in which a computing device 202 is utilized to capture biometric information 210 of a user and an experience payload 212 that is to be associated with the biometric information 210 in accordance with at least one embodiment. In the example of FIG. 2, the biometric information 210 is an image of the user. One of ordinary skill will appreciate that other biometric information can be used in addition to or as an alternative to an image, such as one or more fingerprints of the user, a voice recording of the user, a cardiac signature of the user, a face identifier (e.g., based on one or more facial features of the user), any combination thereof, and/or other biometric information. In the environment 200, a user may utilize a computing device 202 to access an online environment 204 through which the user may generate an experience payload 212. For example, the user may utilize a browser application of the computing device 202 to access a website of an online marketplace through which the user may view and select a variety of items made available by a retailer or other entity. Alternatively, the computing device 202 may include an application provided by the retailer or other entity through which the user may view and select a variety of items and submit requests, via the application, to the retailer or other entity. It should be noted that while the online environment 204 represented in FIG. 2 is that of an online marketplace or other retail environment, the online environment 204 can be implemented for other purposes. For instance, through an online environment, a user may indicate that it wants to schedule an appointment, provide a request for service, reserve one or more items that can be retrieved from the physical office, and the like.

Through the online environment 204 illustrated in FIG. 2, the user may select one or more items that may serve as the experience payload 212 for the user. For example, as illustrated in FIG. 2, the user may have selected several apparel items. The online environment 204 may present the user with various options for continuing its online experience. For instance, the online environment 204 may include a "continue to checkout" button 206, which the user can select to complete their online experience within the online environment 204. If the user selects the "continue to checkout" button 206, the user may be presented, via the online environment 204, with options for providing its payment information, shipping information, order confirmation, and the like.

In an embodiment, the online environment 204 further presents the user with an option to associate its online experience (e.g., digital cart, etc.) with biometric information of the user to allow the user to continue its online experience at a physical location associated with the online experience. For instance, as illustrated in FIG. 2, the online environment 204 may present the user with an "associate with image" button 208, through which the user may opt to associate its online experience with an image of the user captured using the computing device 202. Selection of this button 208 may cause a backend server or other system that implements the online environment 204 to transmit executable instructions to the computing device 202 to initiate one or more peripheral devices associated with the computing device 202. These one or more peripheral devices may include a camera, a microphone, a heart rate sensor, a touchscreen element, and the like. Using these one or more peripheral devices, the user may capture biometric information 210 (e.g., an image of the user, a voice recording of the user, fingerprints of the user, a face identifier of the user, a cardiac signature of the user, etc.) and, via the computing device 202, transmit the biometric information 210 to the backend server or other system. The user's biometric information 210 may be presented within the online environment 204 to allow the user to determine whether the biometric information 210 is acceptable to the user before associating the biometric information 210 with an experience payload 212. Alternatively, if the online environment 204 is provided via an application installed on the computing device 202, the biometric information 210 may be presented directly from the computing device 202.

In an embodiment, the biometric information 210 and the experience payload 212 generated within the online environment 204 may be transmitted to the platform service system 214, which creates an association between the biometric information 210 and the experience payload 212. For instance, once the user has indicated that the biometric information 210 is acceptable for use, the backend server or system that implements the online environment 204 may transmit the biometric information 210 (e.g., the captured image) and experience payload 212 to the platform service system 214. Alternatively, if the online environment 204 is provided via an application installed on the user's computing device 202, the user's computing device 202 may transmit the experience payload 212 and biometric information 210 to the platform service system 214. Through the online environment 204, the user may be provided with instructions for continuing its online experience at a physical location. For instance, as illustrated in FIG. 2, the user may be instructed to go to a biometric kiosk through which the user may provide its biometric information and resume its online experience.

Figure 3:
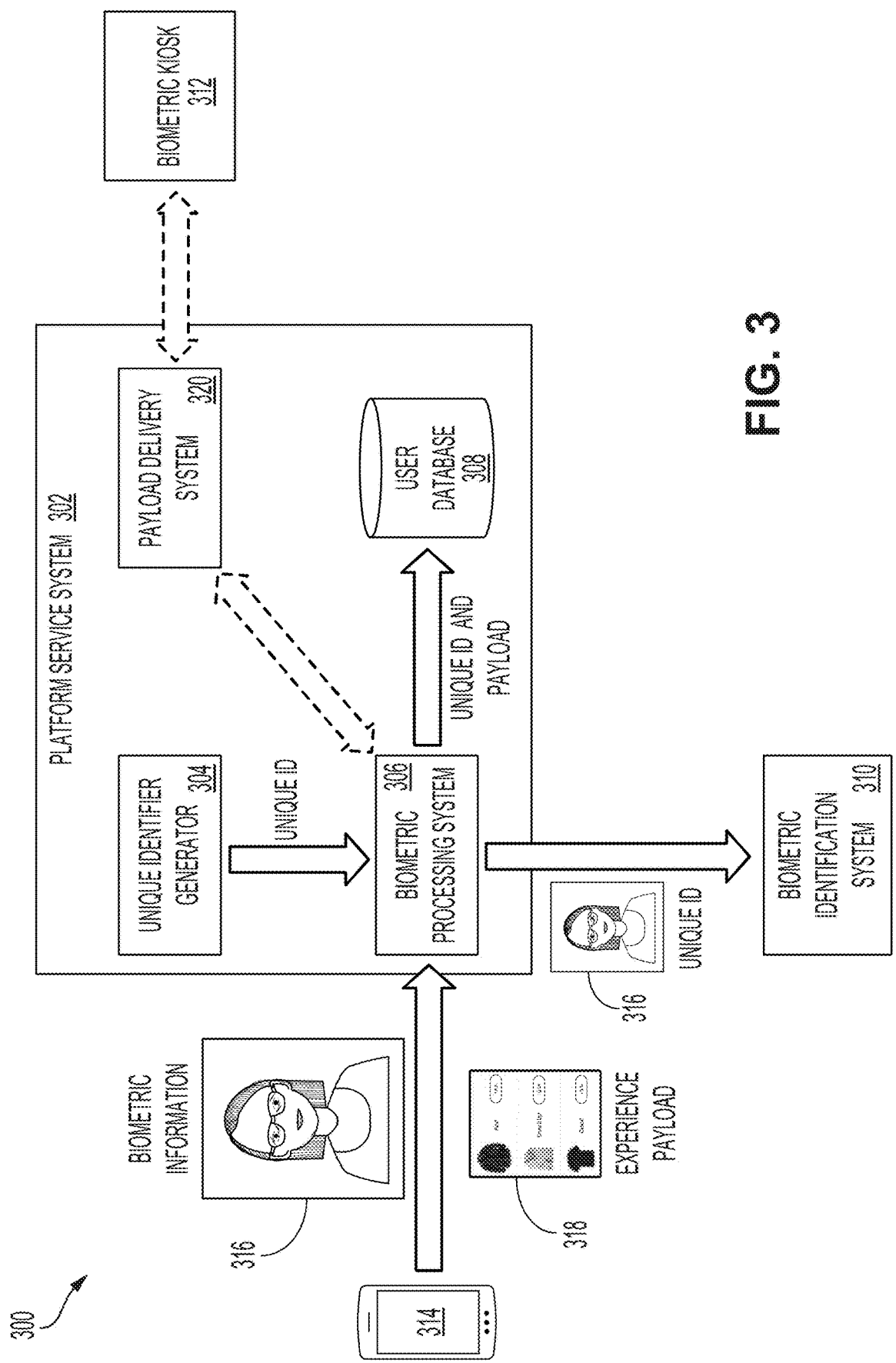
FIG. 3 is a diagram illustrating an example of an environment in which captured biometric information is associated with an experience payload using a platform service system and biometric identification system in accordance with at least one embodiment.

FIG. 3 shows an illustrative example of an environment 300 in which captured biometric information 316 is associated with an experience payload 318 using a platform service system 302 and biometric identification system 310 in accordance with at least one embodiment. In the environment 300, a user's biometric information 316 and experience payload 318 are provided to a biometric processing system 306 of the platform service system 302. The biometric information 316 and experience payload 318 may be provided by a user's computing device 314. For instance, through an application installed on the user's computing device 314, a user may access an online environment through which the user may generate an experience payload 318. The experience payload 318 may include a selection of items that may be purchased from an online marketplace or retailer, an appointment scheduled within the online environment, a request for service, a reservation of one or more items that can be retrieved from a physical office, and the like. The biometric information 316 may include an image of the user, a voice recording of the user, fingerprints of the user, a face identifier of the user, cardiac signatures of the user, and the like, which may be captured using one or more peripheral devices of the user's computing device 314. While the biometric information 316 and experience payload 318 are illustrated as originating from the user's computing device 314, the biometric information 316 and experience payload 318 may be provided by a backend server or other system that implements the online environment through which the user may generate the experience payload 318.

In response to obtaining the biometric information 316 and the experience payload 318, the biometric processing system 306 may utilize a unique identifier generator 304 to obtain a unique identifier that can be associated with the pairing of the biometric information 316 and the experience payload 318. The unique identifier may comprise a unique string of characters randomly selected by the unique identifier generator 304. In an embodiment, the unique identifier is generated subject to an expiration period, whereby if the expiration period elapses, the unique identifier expires and is no longer usable to obtain the experience payload 318.

The biometric processing system 306 may generate, within a user database 308 or other repository, an entry corresponding to the unique identifier provided by the unique identifier generator 304. The entry corresponding to the unique identifier may include the experience payload 318 as well as the biometric information 316 of the user obtained from the user's computing device 314 or backend system that implements the online environment through which the experience payload 318 may be generated. Since each entry in the user database 308 may be keyed to a particular unique identifier, the biometric processing system 306 can query the user database 308 using a unique identifier to identify an entry corresponding to the unique identifier and to obtain any experience payloads associated with the entry (e.g., unique identifier).

In addition to generating an entry in the user database 308 corresponding to the unique identifier and experience payload 318, the biometric processing system 306 may transmit the biometric information 316 and the unique identifier from the unique identifier generator 304 to a biometric identification system 310. It should be noted that while the biometric identification system 310 is illustrated in FIG. 3 as being separate from the platform service system 302 (e.g., implemented via distinct systems or processes separated from the platform service system 302), the biometric identification system 310 can be implemented as a component of the platform service system 302. The biometric identification system 310 may be configured to process the biometric information 316 to generate a set of characteristic representations of the user. This set of characteristic representations may be unique to the user and may correspond to the salient features of the user, physical dimensions or other parameters of these salient features, physical distances between these salient features, and the like.

To generate the set of characteristic representations of the user, the biometric identification system 310 is configured to utilize a neural network (e.g., a CNN, etc.) or other machine learning technique to generate one or more characteristic representations of the user from the biometric information. The set of characteristic representations, in an embodiment, include vector embeddings that are unique to the user and correspond to facial features and dimensions of the user. The set of characteristic representations may differ based on the type of biometric information provided. For instance, if the biometric information includes a voice recording of a user, the biometric identification system 310 may utilize a machine learning model to convert the recording into a sequence of vectors (e.g., feature extraction). This sequence of vectors may be used to identify a set of speech characteristics of the user that may be unique to the user (e.g., pitch, frequency, inflection, etc.) and form a speech signature of the user.

In an embodiment, the biometric identification system 310 associates the set of characteristic representations of the user with the unique identifier provided by the biometric processing system 306. For instance, the biometric identification system 310 may maintain a database or other repository comprising entries corresponding to pairings of unique identifiers and sets of characteristic representations. For instance, each entry may be keyed to a unique set of characteristic representations such that if a set of characteristic representations generated by the biometric identification system 310 matches a set of known characteristic representations maintained in the database or other repository, the biometric identification system 310 may obtain, from a corresponding entry, a unique identifier.

The platform service system 302 may include additional systems and components. For instance, the platform service system 302 may include a payload delivery system 320, which may process requests from a biometric kiosk 312 or other computing device or system operating at a physical location to retrieve an experience payload 318 that may be used to allow users to resume an online experience at the physical location. As described in greater detail below, the biometric kiosk 312 or other computing device or system operating at a physical location may obtain biometric information of a user that may be used to identify a unique identifier that may be used to retrieve an experience payload that may be used by the biometric kiosk 312 to allow the user to resume its online experience at the physical location.

Figure 4:
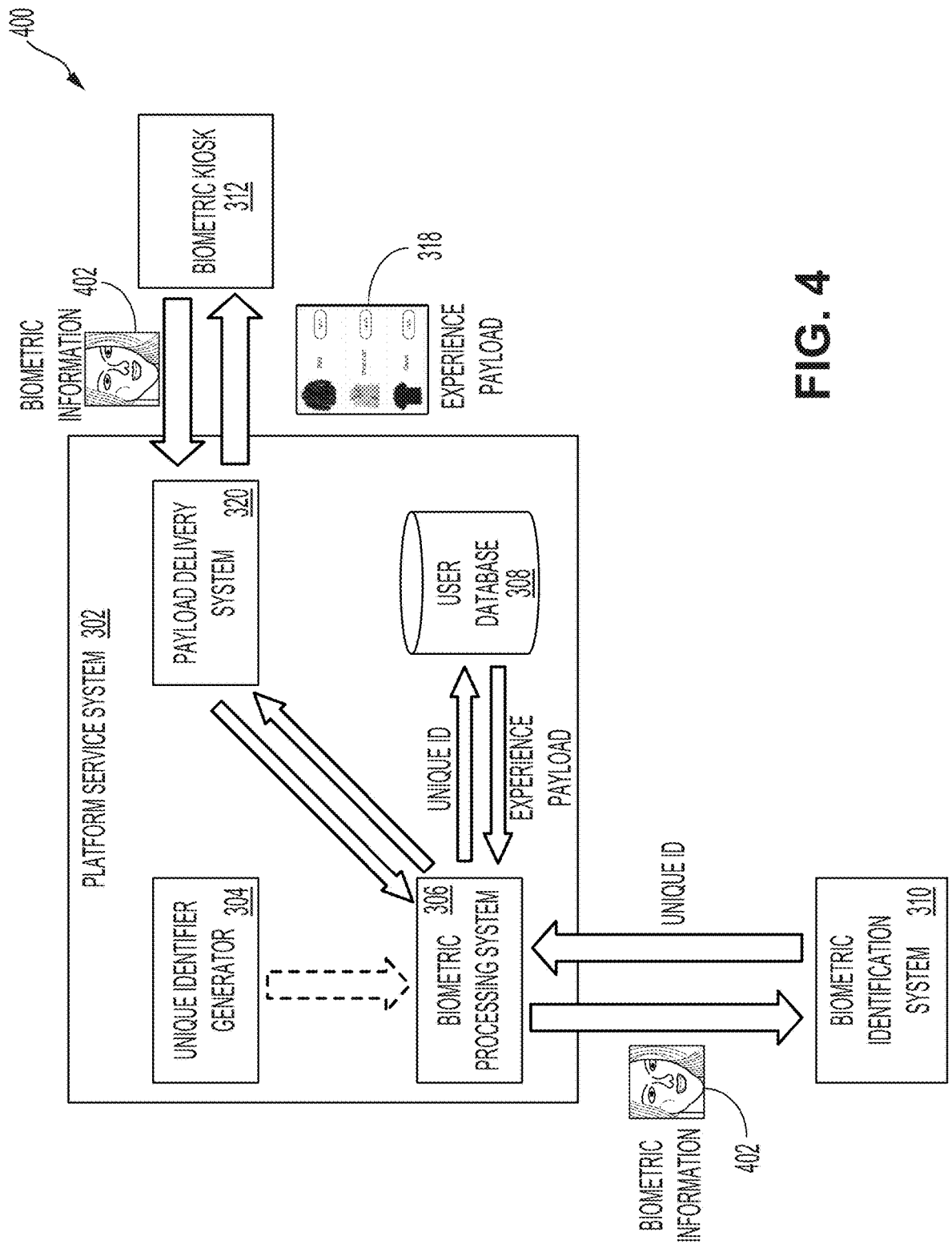
FIG. 4 is a diagram illustrating an example of an environment in which biometric information obtained at a physical location via a biometric kiosk is evaluated to identify an experience payload associated with a user in accordance with at least one embodiment.

FIG. 4 shows an illustrative example of an environment 400 in which biometric information 402 obtained at a physical location via a biometric kiosk 312 is evaluated to identify an experience payload 318 associated with a user in accordance with at least one embodiment. The environment 400 may be similar to that of the environment 300 described above in connection with FIG. 3. For instance, the environment 400 may include a platform service system 302 that comprises the aforementioned unique identifier generator 304, biometric processing system 306, user database 308, and the payload delivery system 320. Further, the platform service system 302 may be in communication with the biometric identification system 310 described above.

In an embodiment, the biometric kiosk 312 or other computing device or system located at a physical location obtains biometric information 402 of a user. For instance, when a user arrives at the physical location, the biometric kiosk 312 may automatically record the biometric information 402 of the user. Alternatively, the user may access the biometric kiosk 312 at the physical location and, via one or more peripheral devices of the biometric kiosk 312, capture biometric information 402 that may be used to identify an experience payload 318 for the user. The biometric information 402 captured by the biometric kiosk 312 may be of the same type as the biometric information that may be obtained from user computing devices when interacting with an online environment as described above. For instance, if a retailer or other provider of an online environment prompts users to provide an image of the user that is to serve as the user's biometric information, the retailer or other provider may configure the biometric kiosk 312 to capture an image of the user.

In response to obtaining biometric information 402 at the physical location, the biometric kiosk 312 may transmit a request to a payload delivery system 320 to obtain an experience payload 318 that may be associated with the user at the physical location. The request may include the biometric information 402 captured by the biometric kiosk 312. The payload delivery system 320 may provide the biometric information 402 from the biometric kiosk 312 to the biometric processing system 306, which may transmit a request to the biometric identification system 310 to determine whether a unique identifier is associated with the biometric information 402. In some instances, the payload delivery system 320 may transmit the biometric information 402 and the request to determine whether a unique identifier is associated with the biometric information 402 directly to the biometric identification system 310 without using the biometric processing system 306.

In an embodiment, the biometric identification system 310 processes the biometric information 402 to obtain a set of characteristic representations of the user at the physical location. As noted above, the biometric identification system 310 may maintain a database or other repository comprising entries corresponding to pairings of unique identifiers and sets of characteristic representations. Each entry may be keyed to a unique set of characteristic representations. The biometric identification system 310 may compare the set of characteristic representations generated from the biometric information 402 to each set of known characteristic representations maintained by the biometric identification system 310 to determine whether a match exists or otherwise the set of characteristic representations is sufficiently similar (e.g., satisfies a similarity threshold) to a set of known characteristic representations maintained by the biometric identification system 310. If the set of characteristic representations of the user from the biometric information 402 does not correspond to a set of known characteristic representations, the biometric identification system 310 may indicate, to the biometric processing system 306, that no unique identifier is available that corresponds to the set of characteristic representations of the user. This may cause the biometric processing system 306 to indicate, to the payload delivery system 320, that no experience payload is available for the user.

If the biometric identification system 310 determines that the set of characteristic representations of the user from the biometric information 402 does correspond to an existing set of characteristic representations maintained by the biometric identification system 310, the biometric identification system 310 may retrieve and provide the unique identifier corresponding to this existing set of characteristic representations to the biometric processing system 306. This may cause the biometric processing system 306 to query the user database 308 to identify an entry corresponding to the provided unique identifier. If the unique identifier has expired or an experience payload corresponding to the unique identifier has been previously retrieved, the user database 308 may not include an entry corresponding to the unique identifier. Thus, if an entry corresponding to the unique identifier is not available within the user database 308, the biometric processing system 306 may indicate, to the payload delivery system 320, that no experience payload is available for the user. However, if the biometric processing system 306 identifies an entry corresponding to the provided unique identifier, the biometric processing system 306 may retrieve the experience payload 318 from the entry and provide the experience payload 318 to the payload delivery system 320. The payload delivery system 320 may transmit the experience payload 318 to the biometric kiosk 312 to fulfill the request from the biometric kiosk 312. Further, the payload delivery system 320 may remove the entry corresponding to the unique payload and experience payload 318 from the user database 308. This may prevent duplicative responses to requests from the biometric kiosk 312 for experience payloads associated with a particular user.

Figure 5:
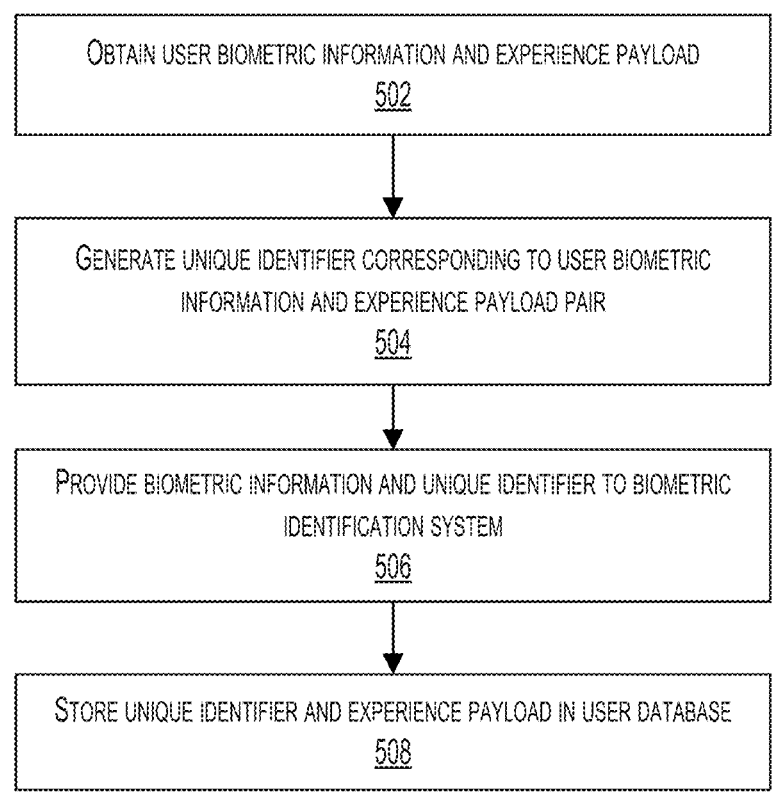
FIG. 5 is a flow diagram illustrating an example of a process for associating an experience payload with a unique identifier and biometric information of a user in accordance with at least one embodiment.

FIG. 5 shows an illustrative example of a process 500 for associating an experience payload with a unique identifier and biometric information of a user in accordance with at least one embodiment. The process 500 may be performed by the platform service system, which may associate an experience payload with biometric information of a user such that the user may continue an online experience at a physical location. At operation 502, the process 500 includes obtaining user biometric information and an experience payload. The user biometric information and experience payload may be provided by a computing device utilized by a user. For instance, through this computing device, a user may access an online marketplace or website through which the user may generate an experience payload. The experience payload may include a selection of items made available through the online marketplace or website, elements associated with a request (e.g., selection of items for repair, selection of services to be performed for the user, etc.), and the like. The user biometric information may be generated using one or more peripheral devices of the user's computing device. For instance, through use of one or more peripheral devices, the user may record a digital image of the user, a voice recording of the user, fingerprints of the user, a face identifier of the user, cardiac signatures of the user, and the like. The biometric information generated for the user may be transmitted to a server that implements the online marketplace or website, where the biometric information may be associated with the user's experience payload. These may be provided to the platform service system.

In some instances, if the experience payload is generated via an application implemented on the user's computing device (e.g., an application of a retailer or other provider, etc.), the user's computing device may provide the biometric information and experience payload directly to the platform service system.

At operation 504, the process 500 includes generating a unique identifier corresponding to the user biometric information and experience payload pair. This unique identifier may be specific to this pairing as opposed to the user associated with the biometric information and the experience payload. For instance, multiple unique identifiers may exist for different biometric information and experience payload pairings of a particular user.

At operation 506, the process 500 includes providing the biometric information and the unique identifier to the biometric identification system. As noted above, the biometric identification system is configured to utilize a neural network (e.g., a CNN, etc.) or other machine learning technique to generate one or more characteristic representations of the user from the biometric information. These one or more characteristic representations, in an embodiment, include vector embeddings that are unique to the user and correspond to facial features and dimensions of the user. The characteristic representations may differ based on the type of biometric information provided. For instance, if the biometric information includes a voice recording of a user, the biometric identification system may utilize a machine learning model to convert the recording into a sequence of vectors (e.g., feature extraction). This sequence of vectors may be used to identify a set of speech characteristics of the user that may be unique to the user (e.g., pitch, frequency, inflection, etc.). As described in greater detail herein, the biometric identification system may associate the unique identifier with the identified characteristic representations of the user. Thus, when a request is received to retrieve an experience payload for a user at a physical location, the biometric information collected at the physical location may be used to identify the unique identifier if the biometric information corresponds to one or more existing or known characteristic representations maintained by the biometric identification system.

At operation 508, the process 500 includes storing the unique identifier and the experience payload in a user database or repository. In an embodiment, the platform service system generates an entry within a user database or other repository corresponding to the unique identifier. For instance, an entry in the user database or other repository may include an experience payload and the associated biometric information. Further, the entry may be keyed to the unique identifier. This allows the platform service system to query the user database or other repository using the unique identifier to retrieve the experience payload as needed. Thus, in response to a request to obtain an experience payload, the platform service system may obtain the unique identifier from the biometric identification system and use this unique identifier to query the user database or other repository to retrieve the experience payload that is to be provided to fulfill the request.

Figure 6:
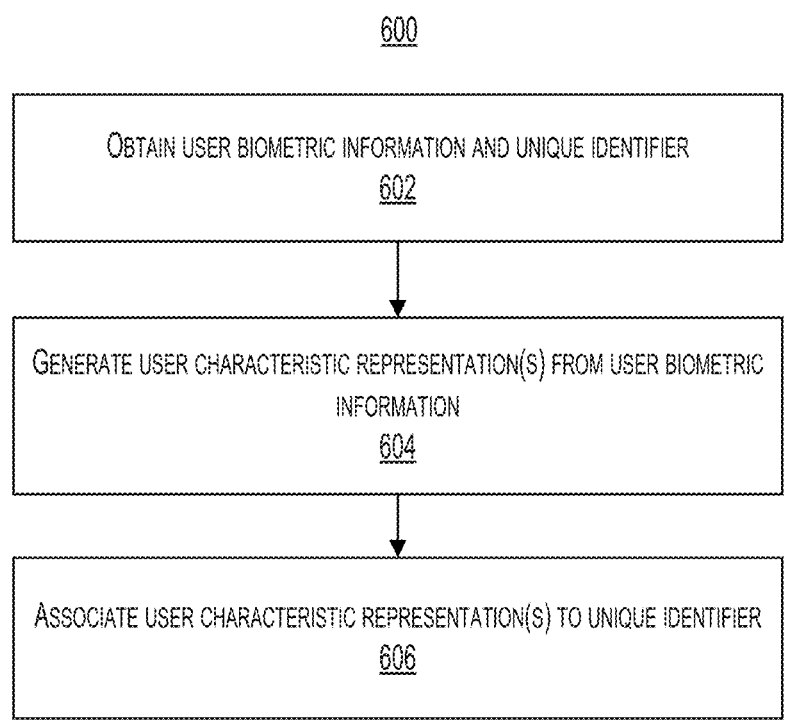
FIG. 6 is a flow diagram illustrating an example of a process for associating user characteristic representations from obtained biometric information with a unique identifier corresponding to an obtained experience payload in accordance with at least one embodiment.

FIG. 6 shows an illustrative example of a process 600 for associating user characteristic representations from obtained biometric information with a unique identifier corresponding to an obtained experience payload in accordance with at least one embodiment. The process 600 may be performed by the biometric identification system, which may process biometric information of a user and obtained from the platform service system. At operation 602, the process 600 includes obtaining user biometric information and a unique identifier corresponding to the user biometric information and an experience payload. As noted above, a platform service system may obtain biometric information and an experience payload from a computing device of a user. For instance, a user may utilize its computing device to access an online marketplace or other website to generate an experience payload. The experience payload may be generated, for example, through selection of one or more items from the online marketplace, as illustrated in FIG. 2. Through the online marketplace or website, the user may indicate that it wants to associate the experience payload with biometric information of the user. The user may utilize one or more peripheral devices of its computing device (e.g., camera, microphone, heart rate sensors, touchscreen, etc.) to record biometric information of the user that can be associated with the experience payload. The biometric information may be provided to a server associated with the online marketplace or website, which in turn may provide the biometric information and experience payload to the platform service system. If the online marketplace is implemented via an application installed on the user's computing device, the computing device itself may transmit the experience payload and biometric information to the platform service system. This pairing of the experience payload and user biometric information may be associated with a unique identifier generated by the platform service system, as described above.

At operation 604, the process 600 includes generating user characteristic representations from the user biometric information provided by the platform service system. For instance, if the biometric information is an image of the user, the biometric identification system may utilize one or more facial recognition algorithms to generate a set of vector embeddings that serve as the characteristic representations of the user. The vector embeddings may represent the user's face and corresponding facial features, including facial geometries (e.g., distance between different facial features, dimensions of different facial features, etc.). The facial recognition algorithms may be implemented via one or more machine learning techniques. These machine learning techniques can include one or more of the following, alone or in combination: geometric recognition algorithms, photometric recognition algorithms, principal component analysis using eigenfaces, linear discrimination analysis, elastic bunch graph matching using Fisherface algorithms, hidden Markov modeling, multilinear subspace learning using tensor representation, neuronal motivated dynamic link matching, or any other suitable machine learning technique. The resulting characteristic representations of the user may be unique to the user and, thus, may be used to identify the user from biometric information provided at a later time. It should be noted that while facial recognition algorithms and techniques are described extensively throughout the present disclosure for the purpose of illustration, other machine learning algorithms and techniques may be used based on the type of biometric information provided (e.g., retinal images, voice recordings, cardiac signatures, face identifier, fingerprints, etc.).

At operation 606, the process 600 includes associating the user characteristic representations to the unique identifier provided by the platform service system. For instance, the biometric identification system may generate an entry within a database or other repository corresponding to the user characteristic representations. The entry may be keyed to the unique identifier provided by the platform service system. Thus, when the biometric identification system obtains biometric information from a physical location system and via the platform service system, the biometric identification system may generate a set of characteristic representations from this newly obtained biometric information and determine whether this set of characteristic representations corresponds to a set of known characteristic representations from the database or other repository. If so, the biometric identification system may provide the corresponding unique identifier to the platform service system, which may utilize the unique identifier to retrieve the associated experience payload for use by the physical location system.

Figure 7:
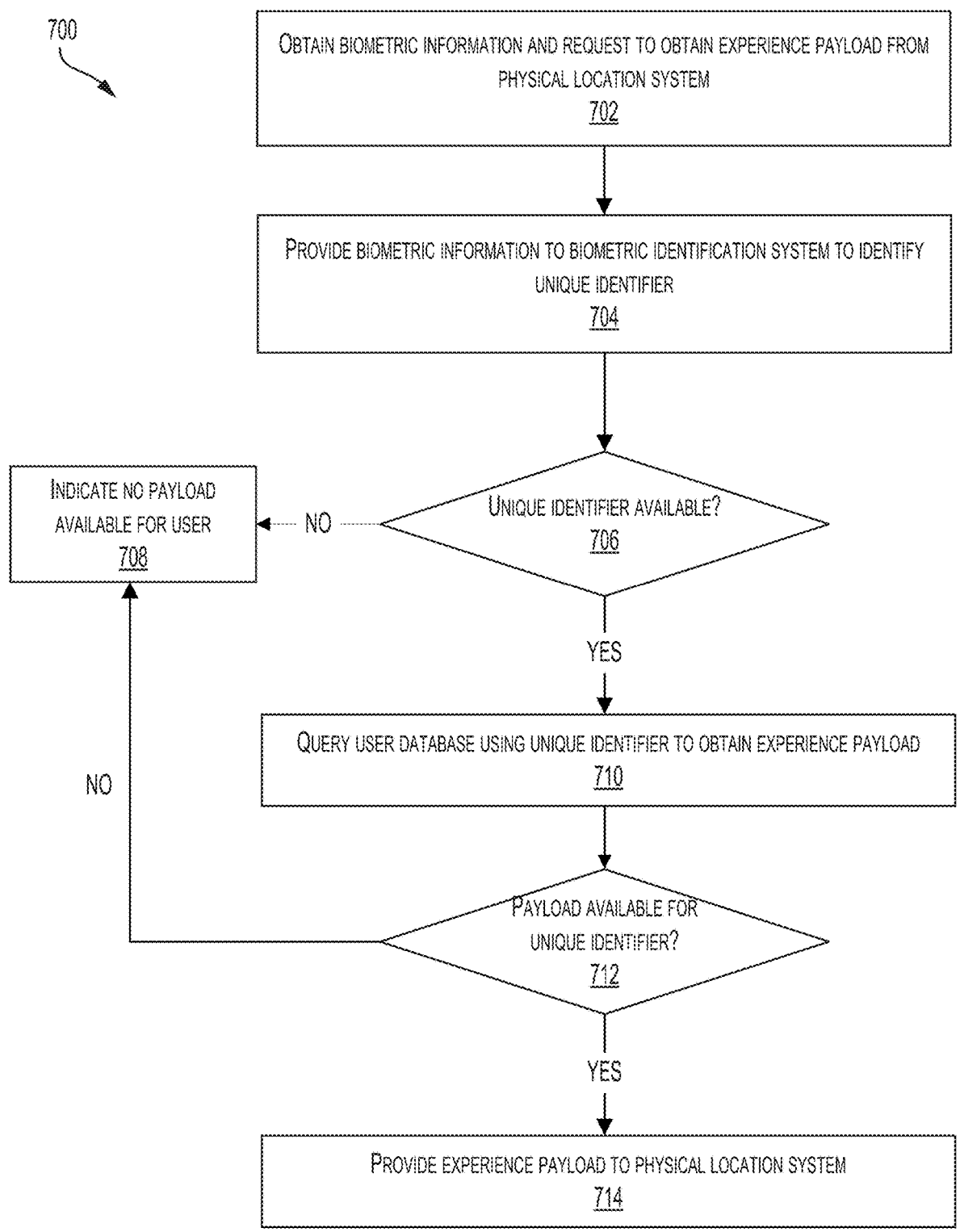
FIG. 7 is a flow diagram illustrating an example of a process for providing an experience payload based on biometric information of a user obtained at a physical location in accordance with at least one embodiment.

FIG. 7 shows an illustrative example of a process 700 for providing an experience payload based on biometric information of a user obtained at a physical location in accordance with at least one embodiment. The process 700 may be performed by the platform service system in conjunction with the biometric identification system. At operation 702, the process 700 includes obtaining biometric information and a request to obtain an experience payload from a physical location system. The physical location system may include a biometric kiosk or other computing device present at the physical location where the user may be located to continue an online experience at the physical location. In an embodiment, the physical location system obtains the biometric information of a user automatically upon detecting the user's presence at the physical location. For instance, when a user arrives at the physical location, the physical location system may record an image of the user automatically. Alternatively, a user may engage the physical location system at the physical location to retrieve the experience payload. The user, through the physical location system, may provide its biometric information. In response to obtaining the biometric information of the user, the physical location system may generate the request to obtain the experience payload and transmit the request and the obtained biometric information to the platform service system.

At operation 704, the process 700 includes providing the biometric information to the biometric identification system to identify a unique identifier that may be associated with the user. As noted above, the biometric identification system may associate one or more characteristic representations of a user with a unique identifier provided by the platform service system. The unique identifier may be generated in response to obtaining a user's biometric information and experience payload from a user's computing device (e.g., mobile device, laptop computing device, etc.) through which the user may interact with an online marketplace or other website through which the user may generate an experience payload. Thus, a unique identifier may be associated with both an experience payload and one or more characteristic representations of a user that generated the experience payload via an online marketplace or other website.

In an embodiment, the biometric identification system utilizes a neural network or other machine learning algorithm to process the biometric information obtained from the physical location system and generate a set of characteristic representations of the user as captured at the physical location. The biometric identification system may compare this set of characteristic representations with known characteristic representations associated with unique identifiers generated by the platform service system. If the biometric identification system identifies a set of known characteristic representations of a user that match or otherwise satisfy a similarity threshold with the set of characteristic representations generated using the biometric information from the physical location system, the biometric identification system may provide the corresponding unique identifier to the platform service system. However, if the biometric identification system is unable to identify a set of known characteristic representations that either match or satisfy a similarity threshold with the set of characteristic representations generated using the biometric information from the physical location system, the biometric identification system may indicate to the platform service system that no unique identifier is associated with the biometric information from the physical location system. Thus, at operation 706, the process 700 includes determining whether a unique identifier is available for the biometric information provided by the physical location system.

At operation 708, the process 700 includes indicating that no experience payload is available for the user. The operation 708 may be performed as a result of a determination that there are no unique identifiers available corresponding to the biometric information obtained from the physical location system. The platform service system may transmit a notification to the physical location system to provide this indication. In some instances, this may cause the physical location system to obtain new biometric information of the user and submit the new biometric information to the platform service system to determine whether an experience payload is available for the user. Alternatively, the physical location system may indicate, to the user or to an associate at the physical location, that no experience available for the user.

At operation 710, the process 700 includes querying a user database using a unique identifier to obtain an experience payload associated with the user. The operation 710 may be performed as a result of a determination that the set of characteristic representations associated with the biometric information obtained from the physical location system matches or otherwise satisfies a similarity threshold with a set of known characteristic representations of a user. As a result of this determination, the biometric identification system may provide a unique identifier associated with the set of known characteristic representations of the user to the platform service system. Using this unique identifier, the platform service system may query the user database to obtain a corresponding experience payload. As noted above, the unique identifier may be generated in response to obtaining biometric information and an experience payload of a user from a computing device of the user. Thus, the unique identifier may be associated with both the known characteristic representations of the user generated from this biometric information and the experience payload.

At operation 712, the process 700 includes determining whether an experience payload is available for the unique identifier. As noted above, once an experience payload has been retrieved for use by a physical location system, the experience payload may be deleted from the user database. Alternatively, a user may request removal of an experience payload. Thus, in some instances, while a unique identifier may exist corresponding to the biometric information of a user, the unique identifier may nevertheless not be associated with a particular experience payload. Thus, if an experience payload is not available, the process 700 may transition to operation 708, which includes indicating that no experience payload is available for the user.

At operation 714, the process 700 includes providing the experience payload to the physical location system to fulfill the request. The operation 714 may be performed as a result of a determination that an experience payload corresponding to the unique identifier obtained by the platform service system is available. Providing the experience payload to the physical location system may cause the physical location system to perform a set of operations associated with the user at the physical location. For instance, if the experience payload includes a set of items that the user wishes to personally inspect, the physical location system may provide the payload to an associate at the physical location that may retrieve these items and provide these items to the user. Further, the physical location system may associate a user's loyalty program information or other contact information from the experience payload with the user's purchase at the physical location. This may provide the user with rewards, discounts, or other benefits.

Figure 8:
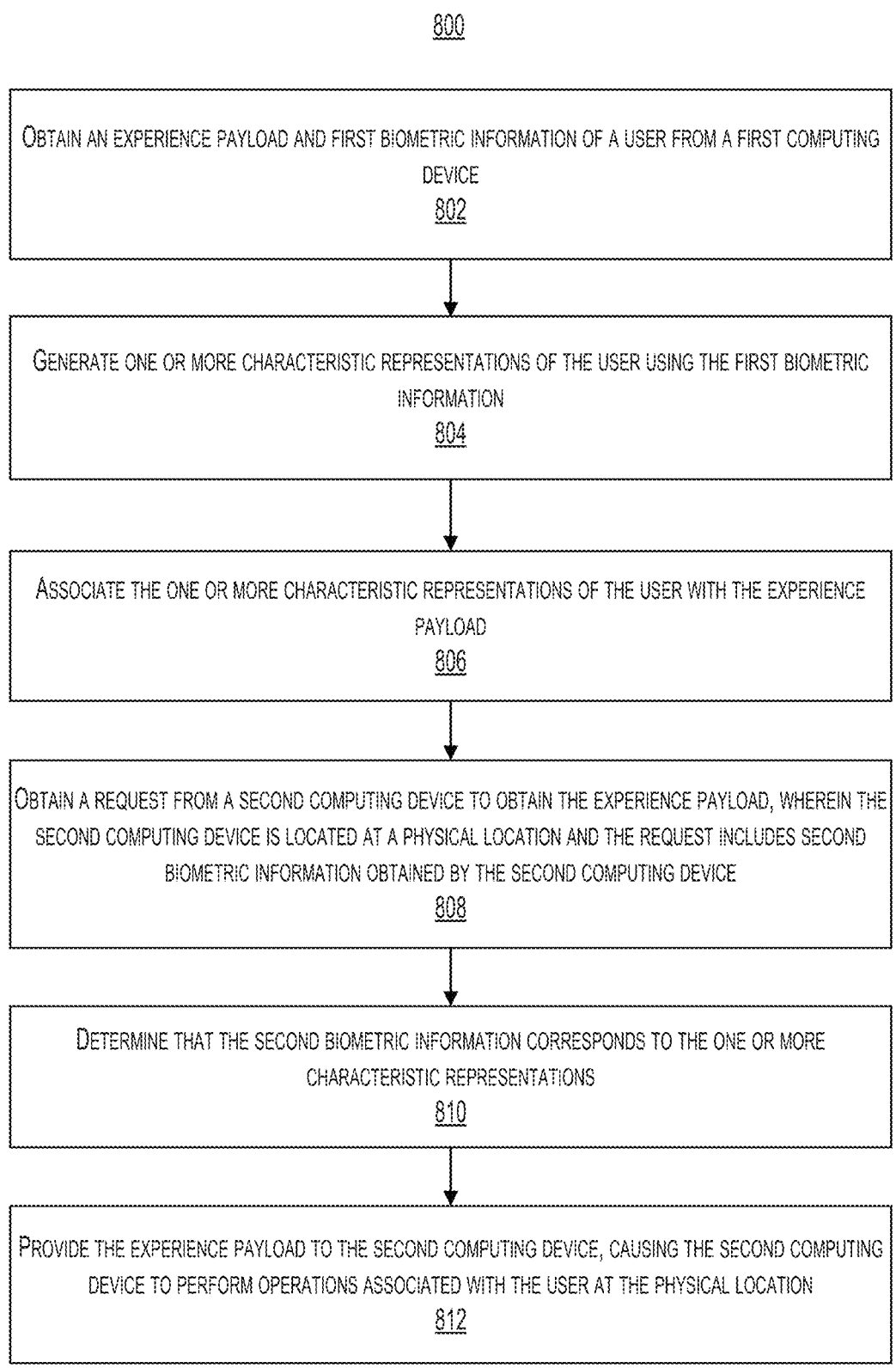
FIG. 8 is a flow diagram illustrating an example of a process for managing one or more experience payloads associated with one or more entities in accordance with at least one embodiment.

FIG. 8 shows an illustrative example of a process 800 for managing one or more experience payloads associated with one or more entities in accordance with at least one embodiment. At operation 802, the process 800 includes obtaining an experience payload and first biometric information of a user from a first computing device. The first computing device may include a mobile device, laptop computing device, a personal computer system, or other computing device utilized by the user. The first computing device may include one or more peripheral devices that may be used to capture the first biometric information. For instance, the first computing device may include a digital camera, a microphone, a heart rate sensor, a touchscreen, and the like. In an embodiment, the experience payload is generated via an online platform, such as an online marketplace implemented on a website. For instance, through a browser application implemented on the first computing device, the user may access a website of an online marketplace and select one or more items. Further, through the website, the user may indicate that it wants to associate the selection of these items with a user's biometric information. This may cause the first computing device to initiate one or more peripheral devices to obtain the first biometric information. The first biometric information may be provided to the online marketplace, which may provide the user's selection (e.g., experience payload) and the first biometric information of the user to the platform service system.

At operation 804, the process 800 includes generating one or more characteristic representations of the user using the biometric information. For instance, in response to obtaining the experience payload and the first biometric information of the user from the first computing device, the platform service system may provide the first biometric information to a biometric identification system to generate the one or more characteristic representations of the user. In an embodiment, the platform service system further provides a unique identifier that corresponds to a pairing of the first biometric information and the experience payload. The biometric identification system may utilize a neural network (e.g., a CNN, etc.) or other machine learning algorithm to generate one or more vector embeddings that represent a user's salient features (e.g., a user's face, a user's fingerprints, a user's voice signature, a face identifier of a user, etc.). These one or more vector embeddings may be unique to the user and, thus, may be used to identify the user at a later time. Thus, the one or more vector embeddings may serve as the one or more characteristic representations of the user.

At operation 806, the process 800 includes associating the one or more characteristic representations of the user with the experience payload. As noted above, the platform service system may generate a unique identifier corresponding to the pairing of the first biometric information and the experience payload. The platform service system may generate a database entry or otherwise maintain a record that includes an association between the unique identifier and this pairing. Further, this unique identifier may be provided to the biometric identification system. The biometric identification system may associate the one or more characteristic representations of the user generated using the first biometric information with the provided unique identifier. Thus, the unique identifier may be associated not only with the experience payload but also the one or more characteristic representations of the user.

At operation 808, the process 800 includes obtaining a request from a second computing device to obtain the experience payload. In an embodiment, the second computing device is located at a physical location. Further, the request can include second biometric information obtained by the second computing device at the physical location. For example, when a user arrives at the physical location, the second computing device may record biometric information of the user. The second computing device may be implemented as a biometric kiosk at the physical location. For instance, the user, upon arriving at the physical location, may approach the biometric kiosk and have the biometric kiosk record the user's biometric information. Alternatively, as the user enters the physical location, the second computing device may automatically record the second biometric information of the user (e.g., via a camera or other image recording device, etc.). In response to obtaining this second biometric information, the second computing device may transmit a request to the platform service system to obtain any experience payloads that may be associated with the user.

At operation 810, the process 800 includes determining that the second biometric information corresponds to the one or more characteristic representations. For instance, in response to the request from the second computing device, the platform service system may transmit the second biometric information from the request to the biometric identification system. This may cause the biometric identification system to use a neural network or other machine learning algorithm to generate one or more vector embeddings from the second biometric information. The biometric identification system may compare these one or more vector embeddings to existing vector embeddings corresponding to different unique identifiers to determine whether the second biometric information corresponds to an existing unique identifier. For example, if the vector embeddings generated from the second biometric information match the vector embeddings from the first biometric information described above, the biometric identification system may determine that the second biometric information is associated with the unique identifier to which the first biometric information of the user is associated. The biometric identification system may provide this unique identifier to the platform service system.

At operation 812, the process 800 includes providing the experience payload to the second computing device. In an embodiment, in response to obtaining the experience payload, the second computing system at the physical location performs a set of operations associated with the user at the physical location. For instance, the second computing system may alert an associate or other representative at the physical location to review the experience payload. This may cause the associate or other representative to retrieve a set of items specified in the experience payload for the user.

In an embodiment, the experience payload is provided with a set of recommendations that can be presented to the user at the physical location. For example, the platform service system may evaluate the second biometric information and the experience payload to identify potential recommendations for items or services that may be of interest to the user. For instance, the platform service system may identify, from the second biometric information and from the experience payload, a user's preferences. Based on these preferences, the platform service system may identify possible items or services that may be of interest to the user and that can be offered to the user at the physical location.

Figure 9:
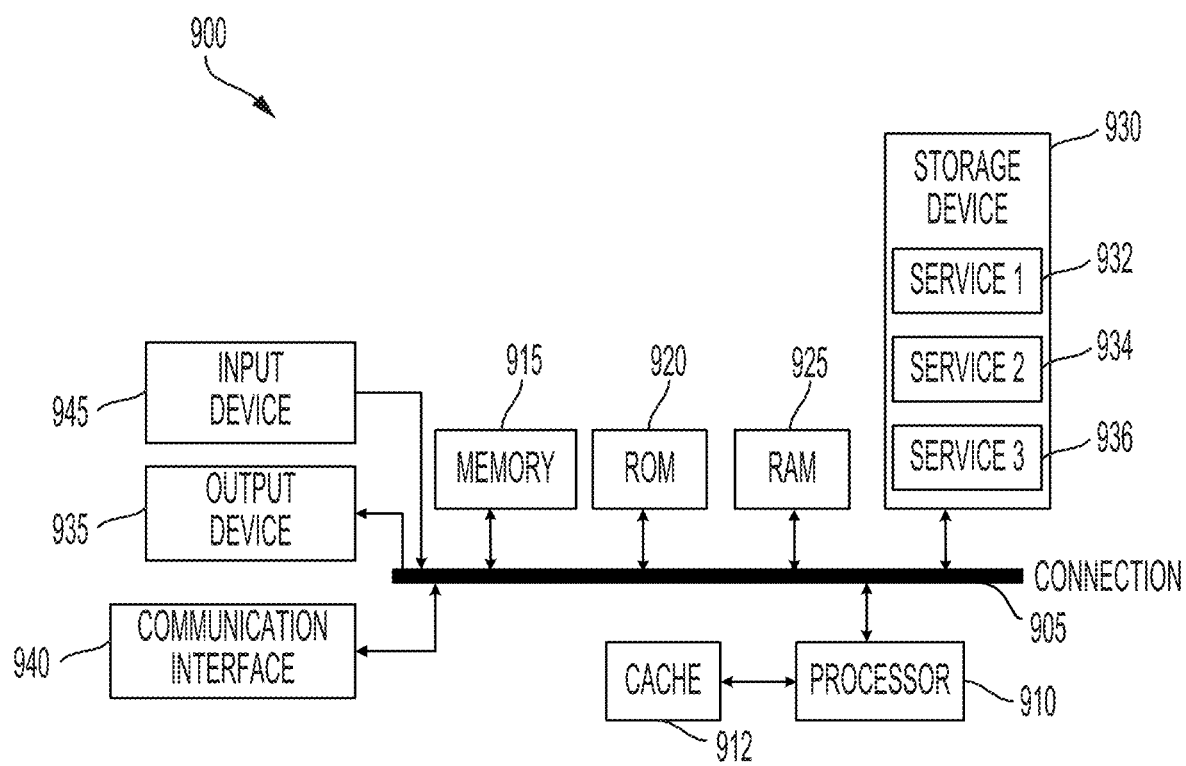
FIG. 9 is an example computing device architecture of an example computing device that can implement the various techniques described herein.

FIG. 9 illustrates an example computing device architecture 900 of an example computing device which can implement the various techniques described herein. For example, the computing device architecture 900 can implement the platform service system 302 and/or the biometric identification system 310 shown in FIG. 3. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, operations or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm operations described in connection with the embodiments disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of managing one or more experience payloads associated with one or more users, comprising:
    obtaining an experience payload and first biometric information of a user, wherein the experience payload includes a product selected by the user during a web browsing experience at a website and available at a physical location associated with the website, and wherein the first biometric information of the user is obtained from a first computing device;
    obtaining an indication that the user opted to translate the web browsing experience to the physical location by associating the first biometric information with the experience payload;
    generating one or more characteristic representations of the user using the first biometric information;
    associating the one or more characteristic representations of the user with the experience payload based on the indication;
    obtaining a request from a second computing device to obtain the experience payload, wherein the second computing device is located at the physical location associated with the website, and wherein the request includes second biometric information obtained by the second computing device from the user at the physical location;
    determining that the second biometric information corresponds to the one or more characteristic representations;
    determining that the user opted to translate the web browsing experience to the physical location when the user arrives at the physical location based on the indication;
    providing the experience payload to the second computing device based on the determination that the user opted to translate the web browsing experience to the physical location, the experience payload causing the second computing device to perform operations associated with the user at the physical location; and
    providing a profile of the user to the second computing device together with the experience payload in response to the request.

2. The method of claim 1, wherein the first biometric information of the user is an image of the user captured using the first computing device.

3. The method of claim 1, further comprising generating a unique identifier corresponding to the first biometric information and the experience payload.

4. The method of claim 3, further comprising:
identifying the unique identifier using the second biometric information corresponding to the one or more characteristic representations of the user; and
obtaining the experience payload using the unique identifier.

5. The method of claim 1, wherein the one or more characteristic representations include vector representations of facial features of the user generated using a neural network.

6. The method of claim 1, further comprising generating a set of recommendations for the user based on the second biometric information and the experience payload.

7. A system for managing one or more experience payloads associated with one or more entities, the system comprising:
one or more processors; and
memory storing thereon instructions that, as a result of being executed by the one or more processors, cause the system to:
obtain an experience payload and first biometric information of a user, wherein the experience payload includes a product selected by the user during a web browsing experience at a website and available at a physical location associated with the website, and wherein the first biometric information of the user is obtained from a first computing device;
obtain an indication that the user opted to translate a web browsing experience to the physical location by associating the first biometric information with the experience payload;
generate one or more characteristic representations of the user using the first biometric information;
associate the one or more characteristic representations of the user with the experience payload based on the indication;
obtain a request from a second computing device to obtain the experience payload, wherein the second computing device is located at the physical location associated with the website, and wherein the request includes second biometric information obtained by the second computing device from the user at the physical location;
determine that the second biometric information corresponds to the one or more characteristic representations;
determine that the user opted to translate the web browsing experience to the physical location when the user arrives at the physical location based on the indication; and
provide the experience payload to the second computing device based on the determination that the user opted to translate the web browsing experience to the physical location, the experience payload causing the second computing device to perform operations associated with the user at the physical location; and
providing a profile of the user to the second computing device together with the experience payload in response to the request.

8. The system of claim 7, wherein the first biometric information includes an image of the user captured using another computing device.

9. The system of claim 7, wherein the instructions further cause the system to generate a unique identifier corresponding to the first biometric information and the experience payload.

10. The system of claim 9, wherein the instructions further cause the system to:
identify the unique identifier based on the indication from a biometric identification system; and
use the unique identifier to obtain the experience payload.

11. The system of claim 7, wherein the experience payload is associated with one or more physical items retrievable at the physical location.

12. The system of claim 7, wherein the one or more characteristic representations include one or more vector representations of a set of features of the user generated using a neural network.

13. The system of claim 12, wherein the instructions further cause the system to generate a set of recommendations for the user based on the set of features identified from the second biometric information and the experience payload of the user.

14. A non-transitory computer-readable storage medium having stored thereon instructions that, when executed by one or more processors, cause the one or more processors to:
obtain an experience payload and first biometric information of a user, wherein the experience payload includes a product selected by the user during a web browsing experience at a website and available at a physical location associated with the website, and wherein the first biometric information of the user is obtained from a first computing device;
obtain an indication that the user opted to translate the web browsing experience to the physical location by associating the first biometric information with the experience payload;
generate one or more characteristic representations of the user using the first biometric information;
associate the one or more characteristic representations of the user with the experience payload based on the indication;
obtain a request from a second computing device to obtain the experience payload, wherein the second computing device is located at the physical location associated with the website, and wherein the request includes second biometric information obtained by the second computing device from the user at the physical location;
determine that the second biometric information corresponds to the one or more characteristic representations;
determine that the user opted to translate the web browsing experience to the physical location when the user arrives at the physical location based on the indication;
provide the experience payload to the second computing device based on the determination that the user opted to translate the web browsing experience to the physical location, the experience payload causing the second computing device to perform operations associated with the user at the physical location; and
providing a profile of the user to the second computing device together with the experience payload in response to the request.

15. The non-transitory computer-readable storage medium of claim 14, wherein the the one or more characteristic representations include one or more vector representations of a set of features of the user generated using a neural network.

16. The non-transitory computer-readable storage medium of claim 14, wherein the experience payload includes a selection of one or more items available at the physical location.

17. The non-transitory computer-readable storage medium of claim 14, wherein the second biometric information includes a digital image of the user.

* * * * *